US012268650B2

(12) United States Patent
Niimi et al.

(10) Patent No.: US 12,268,650 B2
(45) Date of Patent: Apr. 8, 2025

(54) JET NOZZLE

(71) Applicant: AS America, Inc., Piscataway, NJ (US)

(72) Inventors: Hirotaka Niimi, Tokyo (JP); Nitin S. Kolekar, Piscataway, NJ (US); Christopher Helmstetter, Langhorne, PA (US)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 15/734,130

(22) PCT Filed: Jun. 11, 2019

(86) PCT No.: PCT/US2019/036451
§ 371 (c)(1),
(2) Date: Dec. 1, 2020

(87) PCT Pub. No.: WO2020/005529
PCT Pub. Date: Jan. 2, 2020

(65) Prior Publication Data

US 2021/0212890 A1 Jul. 15, 2021

Related U.S. Application Data

(60) Provisional application No. 62/690,384, filed on Jun. 27, 2018.

(51) Int. Cl.

| | |
|---|---|
| ***A61H 33/02*** | (2006.01) |
| ***A61H 33/00*** | (2006.01) |
| ***B05B 7/04*** | (2006.01) |

(52) U.S. Cl.
CPC ....... *A61H 33/027* (2013.01); *A61H 33/6063* (2013.01); *B05B 7/045* (2013.01)

(58) Field of Classification Search
CPC ... A61H 33/027; A61H 33/6063; B05B 7/045
(Continued)

(56) References Cited

U.S. PATENT DOCUMENTS

| | | | | |
|---|---|---|---|---|
| 3,297,025 A * | 1/1967 | Jacuzzi | A61H 33/00 4/541.4 |
| 3,628,529 A * | 12/1971 | Steimle | A61H 33/027 601/169 |

(Continued)

FOREIGN PATENT DOCUMENTS

| | | | |
|---|---|---|---|
| DE | 202015008977 U1 | 9/2016 |
| EP | 0557233 A1 | 8/1993 |
| WO | WO8808058 A1 | 10/1988 |

OTHER PUBLICATIONS

International Search Report mailed Aug. 29, 2019 in corresponding International Application No. PCT/US2019/036451(2 pages).

*Primary Examiner* — Erin Deery
*Assistant Examiner* — William R Klotz
(74) *Attorney, Agent, or Firm* — Tyler A. Stevenson; Anna-Lisa L. Gallo

(57) ABSTRACT

A jet nozzle includes a single-piece body having a water inlet with a first inlet channel coaxial with a first inlet axis, a gas inlet with a second inlet channel coaxial with a second inlet axis, and an outlet coaxial with an outlet axis, the single-piece body defining a fluid passageway from the first inlet channel to the outlet. A channel wall having a water channel is positioned in the fluid passageway between the first inlet channel and the outlet, the water channel being coaxial with the outlet axis and having a diameter that is smaller than a diameter of the first inlet channel. The second inlet axis is substantially perpendicular to and intersects the outlet axis at a point within the water channel.

20 Claims, 8 Drawing Sheets

(58) Field of Classification Search
USPC .......................................................... 4/541.6
See application file for complete search history.

(56) References Cited

U.S. PATENT DOCUMENTS

| | | | | | |
|---|---|---|---|---|---|
| 4,082,091 | A * | 4/1978 | Raab | A61H 33/027 | 4/559 |
| 4,335,854 | A * | 6/1982 | Reynoso | A61H 33/027 | 239/428.5 |
| 4,541,780 | A * | 9/1985 | Moreland | A61H 33/027 | 137/625.41 |
| 4,715,071 | A * | 12/1987 | Henkin | A61H 33/6063 | 4/541.6 |
| 4,928,885 | A * | 5/1990 | Nakao | A61H 33/6052 | 239/417 |
| 4,972,531 | A * | 11/1990 | Gravatt | A61H 33/027 | 239/600 |
| 4,982,460 | A * | 1/1991 | Tobias | A61H 33/027 | 239/428.5 |
| 4,985,943 | A | 1/1991 | Tobias | | |
| 5,279,003 | A * | 1/1994 | Gape | A61H 33/6063 | 239/425.5 |
| 5,809,648 | A | 9/1998 | Kurth | | |
| 6,141,804 | A * | 11/2000 | Pinciaro | A61H 33/6063 | 4/541.6 |
| 8,869,320 | B1 * | 10/2014 | Santamarina | A61H 33/6057 | 4/541.6 |
| 2012/0005819 | A1 * | 1/2012 | Yuhas | A61H 33/6063 | 4/541.6 |

* cited by examiner

SECTION A-A

DETAIL C
SCALE 4.000

DETAIL A
SCALE 4.000

DETAIL B
SCALE 4.000

JET NOZZLE

The present invention, according to some embodiments, relates to jet nozzles which may be used to introduce water into, for example, bath tubs, hot tubs, spas, pools, etc.

BACKGROUND

Jet nozzles may be used to introduce water in a variety of structures including, for example, bath tubs, hot tubs, spas, pools, and the like. The jet nozzles can be installed into the walls and/or floor of the structures and be configured to output water under pressure to create effects that are desirable to users for relaxation, massage, hydrotherapy, etc. In some instances, the jet nozzles may be further configured to aerate the water by incorporating air into the water stream by using, for example, a Venturi effect.

A difficulty faced with certain existing jet nozzles is that the jet nozzles may not be dimensioned to fit into tight areas. Accordingly, portions of the jet nozzles may protrude from the body of the tub and can be subjected to damage during installation. For example, in some situations a jet nozzle that protrudes significantly from the outer surface of a tub may be knocked from the tub when the tub is being moved through a doorway or other confined space prior to installation.

Some jet nozzles are also constructed from multiple components which may be configured to move relative to each other. For example, some jet nozzles are configured such that the direction of a water and/or air inlet may be rotated with respect to other portions of the jet nozzle. Other jet nozzles include separate movable components which are configured to allow for variable flow. The use of such multiple components, however, necessitates more complex fabrication techniques and may also contribute to the larger overall dimensions of the jet nozzle.

SUMMARY

The present invention, in some embodiments, provides a jet nozzle which can overcome one or more of the difficulties described above. In some embodiments, a jet nozzle according to the present invention has a smaller size than certain existing jet nozzles and is configured to be flush with an outer surface of a tub or protrude minimally (e.g., less than two inches) from an outer surface of the tub. In further embodiments, a jet nozzle according to the present invention may have a unitary construction, for example, being fabricated (e.g., molded) as a single piece. The present invention, according to additional embodiments, includes a tub including one or more jet nozzles as described herein. The tub may be, for example, a bath tub, a hot tub, a spa tub, etc. In some embodiments, a jet nozzle according to the present invention includes a single-piece body having a water inlet with a first inlet channel coaxial with a first inlet axis, a gas inlet with a second inlet channel coaxial with a second inlet axis, and an outlet coaxial with an outlet axis, the single-piece body defining a fluid passageway from the first inlet channel to the outlet. In some embodiments, a channel wall defining a water channel that is positioned in the fluid passageway between the first inlet channel and the outlet, the water channel being coaxial with the outlet axis and having a diameter that is smaller than a diameter of the first inlet channel. In some embodiments, the second inlet axis is perpendicular to and intersects the outlet axis at a point within the water channel. In some embodiments, a mixing chamber coaxial with the outlet axis and positioned in the fluid passageway between the water channel and the outlet, the mixing chamber being in flow communication with the gas inlet and having a diameter greater than the diameter of the water channel.

In some embodiments, a jet nozzle further includes an air chamber in flow communication with and disposed between the second inlet channel and the mixing chamber. In some such embodiments, the air chamber surrounds the channel wall. In some embodiments, the first inlet axis is parallel to the second inlet axis. In some embodiments, the first inlet axis intersects the outlet axis at a point located within the first inlet channel. In some embodiments, the water inlet and the gas inlet extend away from the outlet axis in substantially opposite directions. In further embodiments, the water inlet and the gas inlet are fixed relative to each other.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
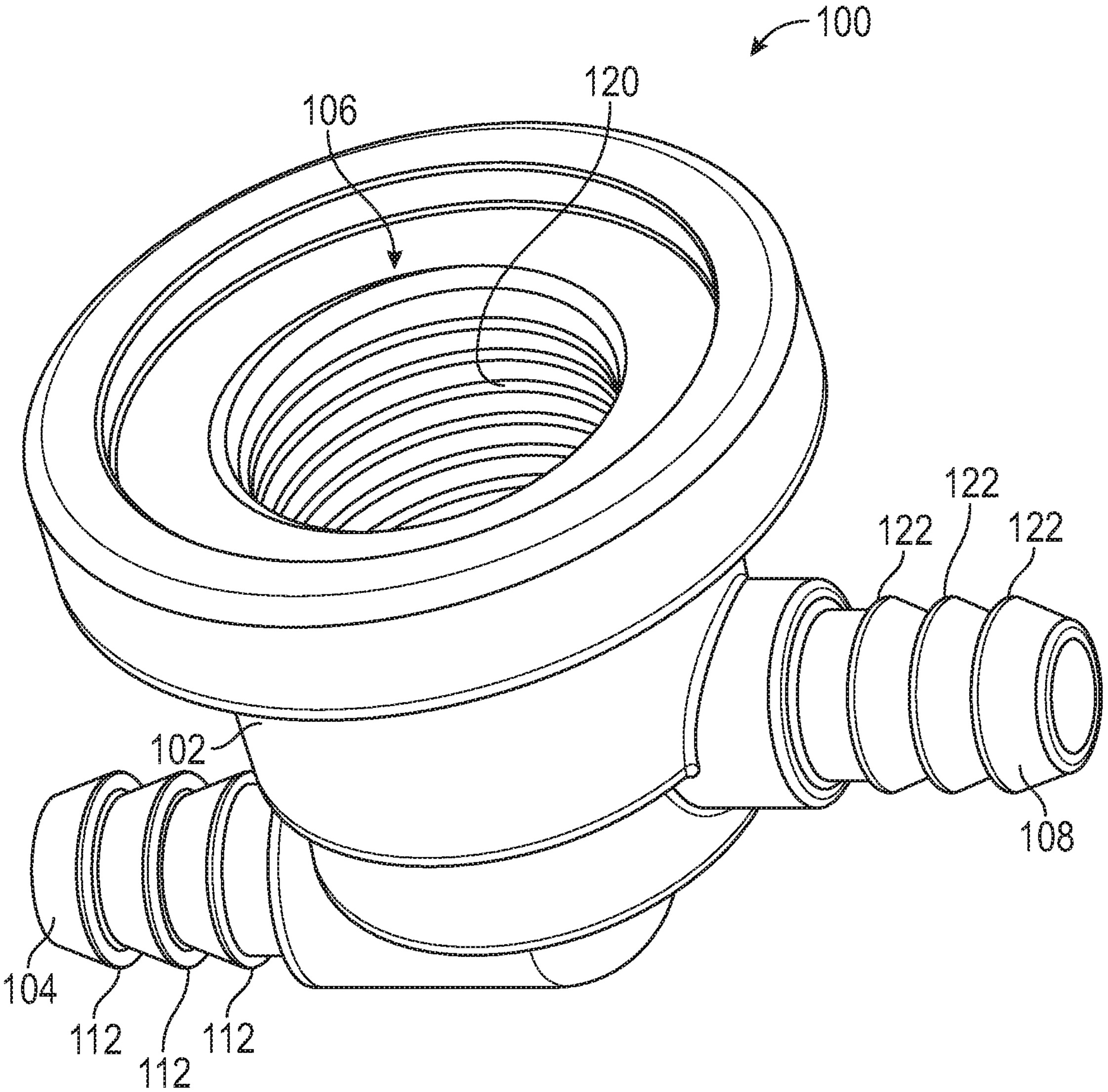
FIG. 1 shows a perspective view of a jet nozzle according to an embodiment of the present invention.

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. All publications, patent applications, patents, and other references mentioned herein are incorporated by reference in their entirety.

Referring to the drawings in detail, wherein like reference numerals indicate like elements throughout, there is shown in FIGS. 1-4 a jet nozzle, generally designated 100, in accordance with an exemplary embodiment of the present invention. The overall height of the nozzle 100 may be reduced, as compared to existing nozzles, in order to minimize how far the nozzle 100 projects from a tub. Reducing the height of the nozzle 100 may help in preventing damage to the nozzle 100 while installing a tub and allow for the tub to be more easily installed in spaces having tight tolerances. In some embodiments, the height of the nozzle 100 is reduced by providing an interior nozzle or water channel 116 having a channel wall 114 that at least partially overlaps with the outlet of the gas channel 124 as discussed in further detail below. In some embodiments, the height of the nozzle 100 is reduced by manufacturing the nozzle 100 as a single unitary component as discussed in further detail below.

In some embodiments, jet nozzle 100 includes a body 102 which defines a fluid passageway from a water inlet 104 to an outlet 106. In some embodiments, jet nozzle 100 further includes an air inlet 108 which is configured to receive and conduct air or other gas into the fluid passageway. In some embodiments, jet nozzle 100 including body 102, water inlet 104, air inlet 108, and outlet 106 can be fabricated as a single, unitary component. For example, in some embodiments, the entirety of jet nozzle 100 as illustrated in FIGS. 1-4 can be molded as a single component, can be produced by 3D printing (additive manufacturing) as a single component, milled or machined from a monolithic material, or otherwise fabricated as a single piece using other known manufacturing techniques. Jet nozzle 100 may be made from a rigid material, for example, a hard plastic, composite material, or metal according to some embodiments.

In some embodiments water inlet 104 is configured to couple with a fluid source (e.g., tub recirculation pump, plumbed water line, etc.) and receive fluid (e.g., water) therefrom. Water inlet 104, in some embodiments, may be configured to directly connect to piping or tubing that conveys fluid from the fluid source. For example, water inlet 104 may be configured to be inserted into and form a push-connection with a flexible hose or tubing. In some embodiments, an exterior portion of water inlet 104 is provided with one or more (e.g., three or more) hose barbs 112 which are configured to help secure water inlet 104 within the end of the hose or tubing.

Figure 4:
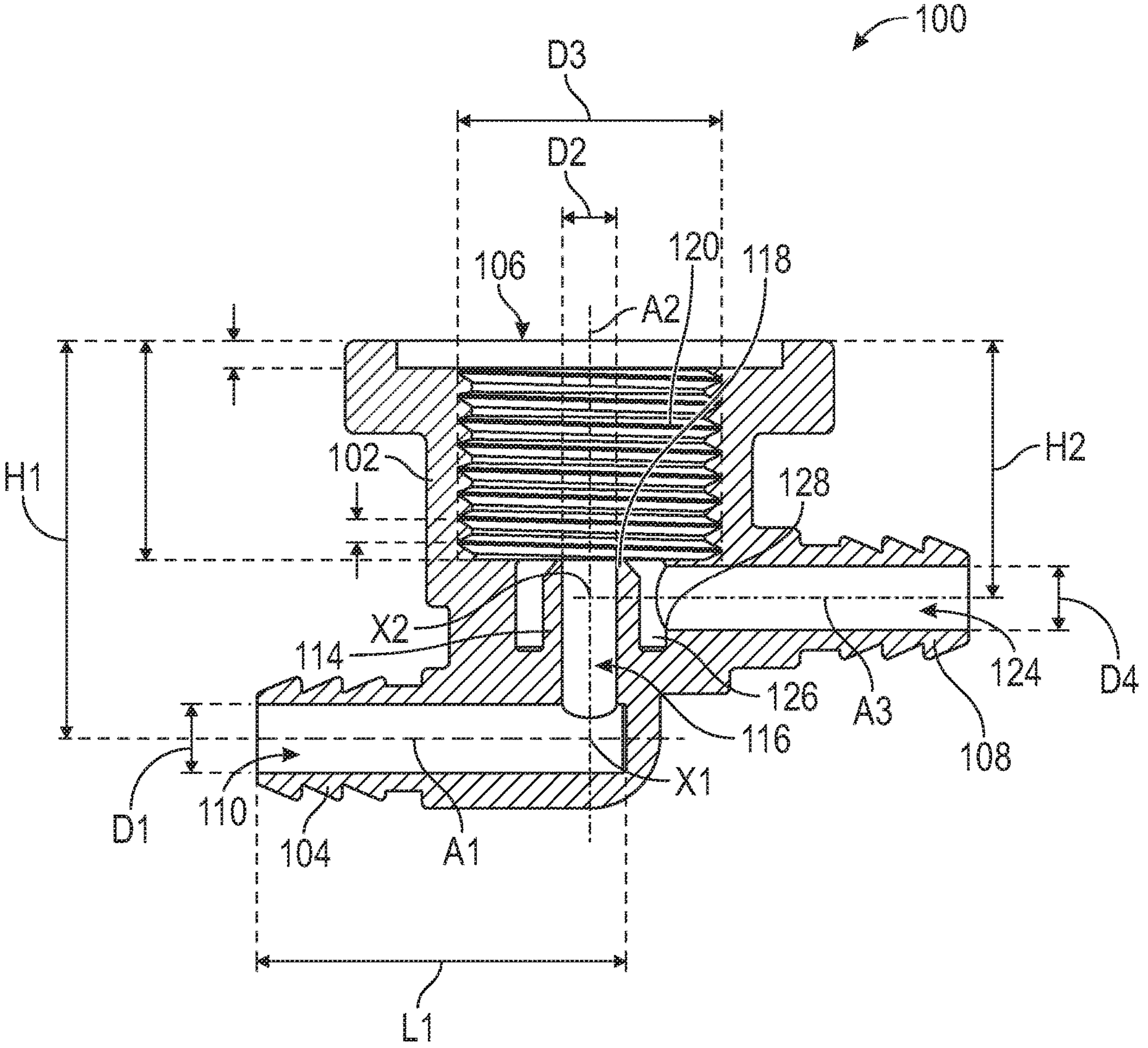
FIG. 4 shows a side cross-sectional view of the jet nozzle of FIG. 3 taken across the plane designated by line 4-4.
Figure 5A:
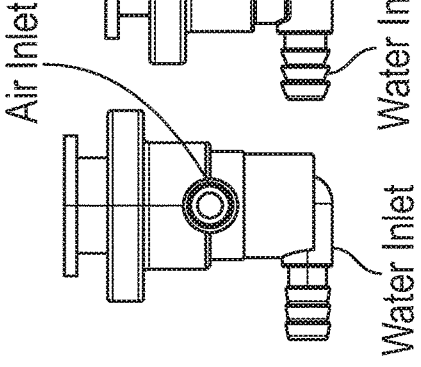
FIG. 5A shows a side view of a jet nozzle according to the current state of the art.
Figure 5B:
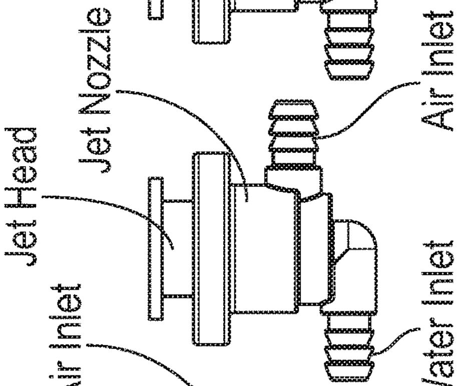
FIGS. 5B-5F shows side views of jet nozzles according to certain embodiments of the present invention.
Figure 5C:
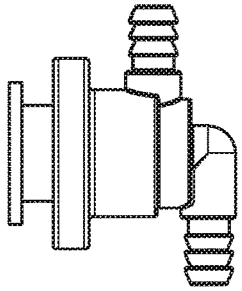
Figure 5D:
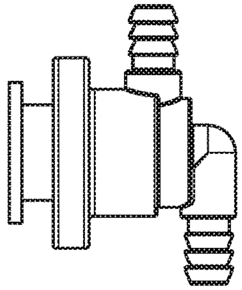
Figure 5E:
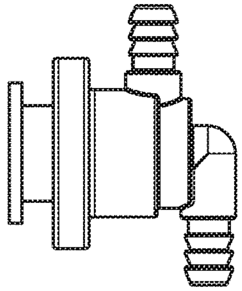
Figure 5F:
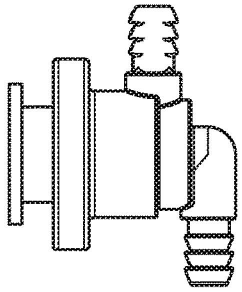

As best illustrated in FIG. 4, in some embodiments, water inlet 104 includes an inlet channel 110 which is coaxial with a first inlet axis A1 that is centrally disposed through inlet channel 110. Inlet channel 110 may have a length L1 that is for example, about 1.0 inch to about 1.7 inches, about 1.1 inches to about 1.6 inches, about 1.2 inches to about 1.5 inches, about 1.3 inches to about 1.4 inches, or about 1.31 inches to about 1.33 inches. In some embodiments, length L1 is or about 1.320 inches±0.005 inches. Inlet channel 110 may further have a diameter D1 that is, for example, about 0.20 inches to about 0.30 inches, about 0.22 inches to about 0.28 inches, or about 0.24 inches to about 0.26 inches. In some embodiments diameter D1 is or about 0.250 inches±0.005 inches. Diameter D1, in some embodiments, may be the broadest diameter of inlet channel 110. In some embodiments, inlet channel 110 is configured such that a ratio of length L1 to diameter D1 is about 5 to about 5.5, about 5.1 to about 5.4, about 5.2 to about 5.3, or about 5.28. In some embodiments, a distance H1 from the end of outlet 106 to first inlet axis A1 is about 1.30 to about 1.55 inches, about 1.35 to about 1.50 inches, or about 1.40 inches to about 1.45 inches. In some embodiments, distance H1 is or about 1.433 inches±0.005 inches.

In some embodiments, jet nozzle 100 includes a restriction tube or water channel 116 between water inlet 104 and outlet 106 which is configured to channel fluid from water inlet 104 towards outlet 106. In some embodiments, water channel 116 is defined by a channel wall 114 that is connected to and in flow communication with inlet channel 110. Channel wall 114, in some embodiments, extends within body 102 to an open end 118 and is perpendicular or substantially perpendicular to water inlet 104. In some embodiments, channel wall 114 is configured as a tube which is disposed about outlet axis A2 such that channel wall 114 and water channel 116 are coaxial with an outlet axis A2 as shown in FIG. 4. According to the illustrated embodiment, outlet axis A2 is centrally disposed through water channel 116. In some embodiments, outlet axis A2 is perpendicular or substantially perpendicular to first inlet axis A1 such that the fluid path from inlet channel 110 to water channel 116 includes a perpendicular turn. In some embodiments, first inlet axis A1 intersects with outlet axis A2 at a point X1 within inlet channel 110. In some embodiments, a distance between the outlet axis A2 to an end of water inlet 104 is or about 1.20 inches±0.01 inches.

The water channel 116 may have a reduced diameter as compared to the inlet channel 110 to increase the velocity of the fluid and form a jet. In some embodiments, water channel 116 includes a diameter D2 that is less than diameter D1 of inlet channel 110. In some embodiments, diameter D2 is, for example, less than about 0.20 inches. In some embodiments, diameter D2 is about 0.150 inches to about 0.199 inches, about 0.160 inches to about 0.199 inches, about 0.170 inches to about 0.199 inches, about 0.180 inches to about 0.199 inches, or about 0.190 inches to about 0.199 inches. In some embodiments, diameter D2 is about 0.188 inches to about 0.198 inches, about 0.190 inches to about 0.196 inches, or about 0.192 inches to about 0.194 inches. In some embodiments, diameter D2 is or about 0.193 inches±0.005 inches. In some embodiments, jet nozzle 100 is configured such that a ratio of diameter D2 to diameter D1 is about 0.70 to about 0.85, about 0.71 to about 0.84, about 0.72 to about 0.83, about 0.73 to about 0.82, about 0.74 to about 0.81, about 0.75 to about 0.80, about 0.76 to about 0.79, or about 0.77 to about 0.78. In some embodiments, the ratio of diameter D2 to diameter D1 is or about 0.772. In some embodiments, diameter D2 is constant through the entire length of water channel 116. In other embodiments, water channel 116 tapers to diameter D2.

In some embodiments, as fluid (e.g., water) flows through inlet channel 100 and water channel 116, the fluid velocity increases because of the smaller diameter D2 (and smaller cross-sectional area) of water channel 116. This in turn creates a Venturi effect, according to some embodiments, resulting in a decrease in static pressure in the fluid and causing air to be drawn through air inlet 108 and incorporated into the fluid stream, as will be further described herein.

In some embodiments, water channel 116 extends from inlet channel 100 to end 118 of channel wall 114. In some embodiments end 118 of channel wall 114 opens to a chamber 120 defined in body 102 of jet nozzle 100 which in turn leads to outlet 106. In some embodiments, end 118 of channel wall 114 extends to and/or is positioned within chamber 120 such that chamber 120 surrounds at least a portion of channel wall 114. In some embodiments, end 118 of channel wall 114 includes a beveled or chamfered edge which, for example, may be configured to direct the flow of air or other gas around end 118. Chamber 120, in some embodiments, is coaxial with channel wall 114 and outlet axis A2 and may have a diameter D3 that is larger than each of diameters D1 and D2. As shown in the illustrated embodiments, outlet axis A2 may be centrally disposed through chamber 120 and outlet 106. Diameter D3 may be, for example, about 0.80 inches to about 1.00 inches, about 0.830 inches to about 0.960 inches, or about 0.837 inches to about 0.949 inches according to some embodiments. In some embodiments, chamber 120 may have internally threaded walls as illustrated which are configured to engage with a separate jet head (not shown) having a corresponding external thread. In some embodiments, the separate jet head may help control or direct the flow of fluid exiting outlet 106. The jet head may include, for example, one or more apertures through which the fluid from chamber 120 may flow. In some embodiments, the separate jet head may screwed into chamber 120 through outlet 106 by rotating the jet head relative to chamber 120 about outlet axis A2.

Figure 2:
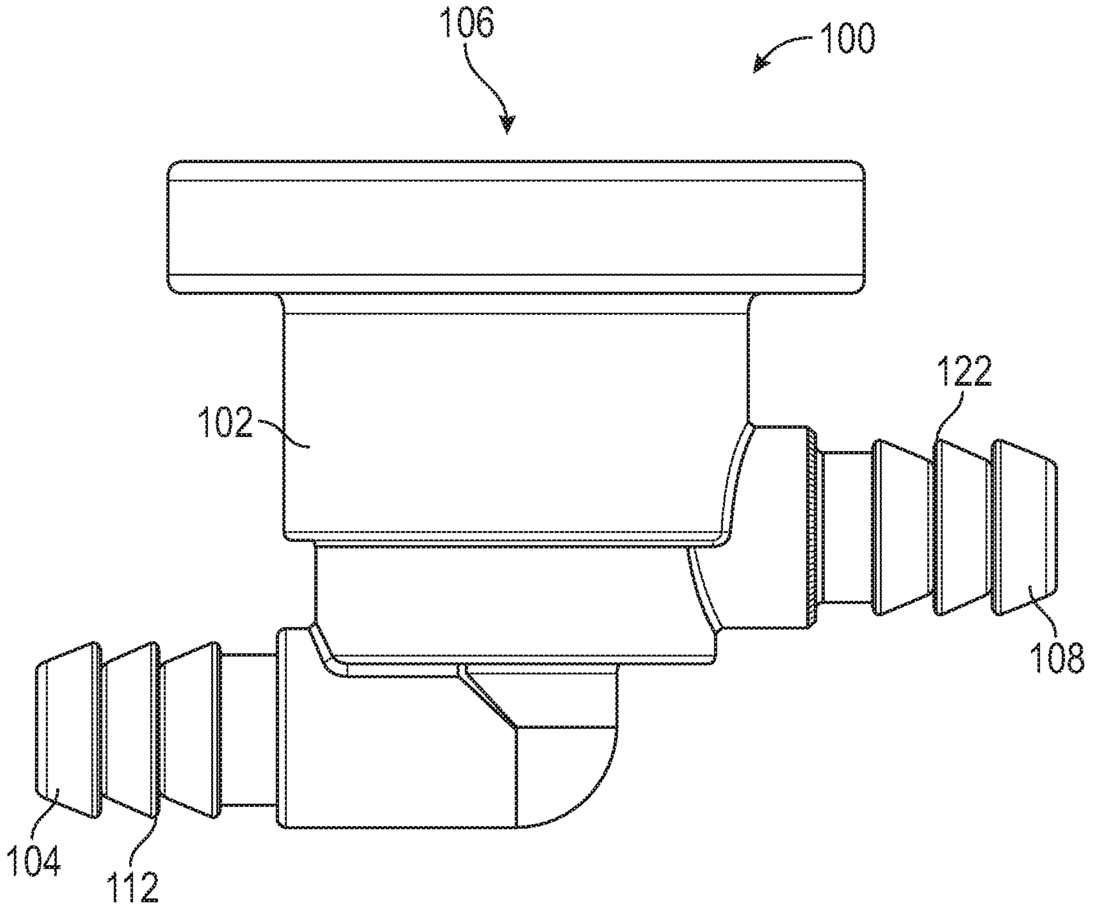
FIG. 2 shows an elevational view of the jet nozzle of FIG. 1.
Figure 3:
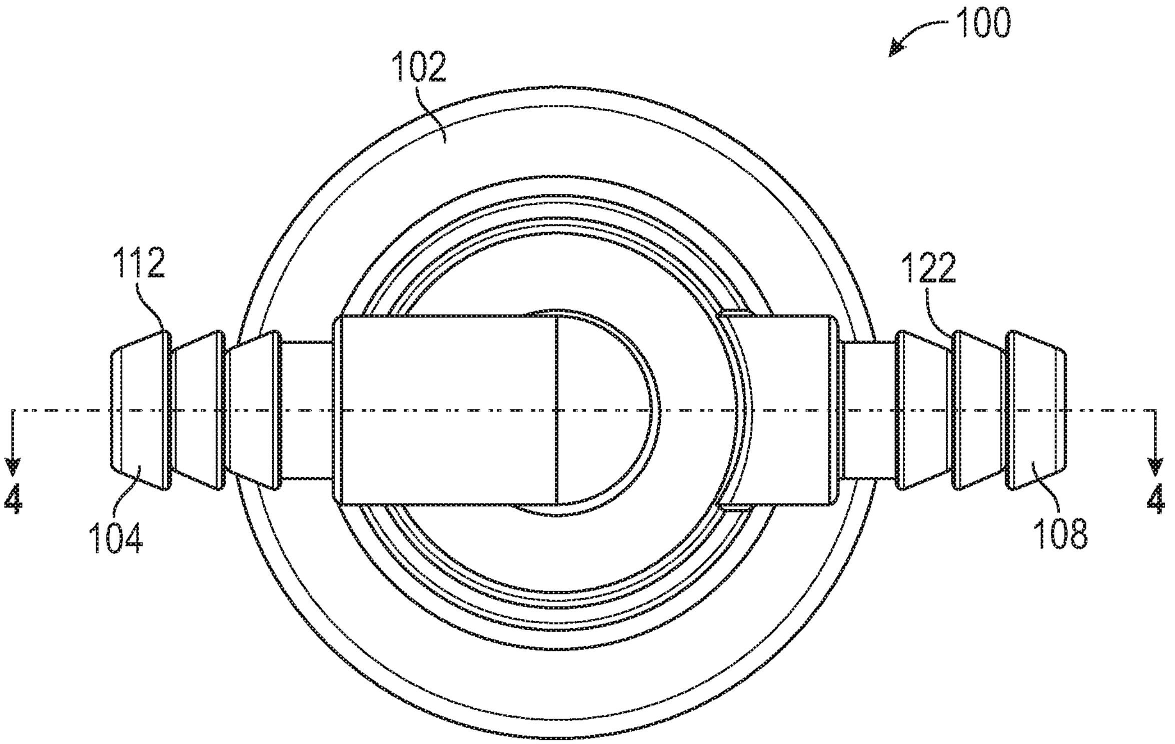
FIG. 3 shows a plan view of the jet nozzle of FIG. 1.

In some embodiments, air may be mixed with the fluid stream in chamber 120 during use of jet nozzle 100 to aerate the fluid stream before the fluid stream exits outlet 106. Chamber 120 may therefore serve as a mixing chamber according to some embodiments. As described previously, in some embodiments jet nozzle 100 includes an air inlet 108 which is configured to receive and conduct air or other gas into the fluid passageway of jet nozzle 100. In some embodiments, air inlet 108 is configured to couple with a gas source (e.g., air pump, pressurized gas source, atmospheric gas, etc.) and receive air or other gas therefrom. Air inlet 108, in some embodiments, may be configured to directly connect to piping or tubing that conveys gas from a gas source. For example, air inlet 108 may be configured to be inserted into and form a push-connection with a flexible hose or tubing. In some embodiments, air inlet 108 may extend in a direction that is generally opposite of water inlet 104, e.g., radially opposite with respect to outlet axis A2. The term "opposite direction" may mean wherein a first inlet axis and a second inlet axis are substantially parallel. In some embodiments, air inlet 108 and water inlet 104 are fixed and are not capable of moving relative to each other. As illustrated in FIGS. 1-3, in some embodiments an exterior portion of air inlet 108 is provided with one or more (e.g., three or more) hose barbs 122 which are configured to help secure air inlet 108 within the end of a hose or tubing.

Referring again to FIG. 4, the water channel 116 may at least partially overlap with the gas channel 124 positioning the water inlet 104 closer to the air inlet 108 and resulting in an overall reduction of height for the jet nozzle 100. In some embodiments air inlet 108 defines a gas channel 124 which is coaxial with a second inlet axis A3 that is centrally disposed through gas channel 124. In some embodiments gas channel 124 extends to an open end 128 which may connect to an air chamber 126 that at least partially surrounds the outside of channel wall 114. In some embodiments, channel wall 114 extends perpendicularly (e.g., along axis A2) beyond open end 128 of gas channel 124, such that, for example, end 118 of channel wall 114 is positioned at a location past open end 128. In some embodiments, end 118 of channel wall 114 is positioned between open end 128 and outlet 106. In some embodiments, end 118 of channel wall 114 extends within chamber 120. In some embodiments, such configurations allow jet nozzle 100 to have a smaller overall dimension along axis A2. Furthermore, in some embodiments, jet nozzle 100 is configured such that air exiting gas channel 124 impinges on the outside of channel wall 114 which can create turbulent flow and subsequent mixing with the water flowing from channel wall 114 in chamber 120 (e.g., as visualized in the flow paths shown in FIGS. 17A-17D). For example, during use of jet nozzle 100, according to some embodiments, the flow of air or other gas through gas channel 124 of air inlet 108 may be laminar or substantially laminar within gas channel 124. As the air or other gas exits open end 128 of gas channel 124 the air or other gas enters air chamber 126 and is forced to flow around the outside of channel wall 114 positioned therein. In some such embodiments, the flow of air or other gas may become turbulent within air chamber 126 as a result. The air or other gas is then allowed to mix with the water stream exiting from water channel 116 at chamber 120 forming an aerated water stream that exits outlet 106 of jet nozzle 100.

Second inlet axis A3, in some embodiments, may be parallel and coplanar to but not coaxial with first inlet axis A1. In some embodiments, second inlet axis A3 is perpendicular to outlet axis A2. In some embodiments, second inlet axis A3 intersects with outlet axis A2 at a point X2 that is between inlet channel 110 and outlet 106. In some embodiments, second inlet axis A3 intersects with outlet axis A2 at a point X2 that is between inlet channel 110 and chamber 120. In some embodiments, second inlet axis A3 intersects with outlet axis A2 at a point X2 that is between point X1 and end 118 of channel wall 114. In some embodiments, second inlet axis A3 intersects with outlet axis A2 at a point X2 within water channel 116.

In some embodiments, a distance between the outlet axis A2 and an end of gas inlet 108 is or about 1.357 inches±0.005 inches. In some embodiments, the distance between point X1 and point X2 (e.g., a perpendicular distance between first inlet axis A1 and second inlet axis A2) is about 0.40 inches to about 0.60 inches, about 0.42 inches to about 0.58 inches, about 0.44 inches to about 0.56 inches, about 0.46 inches to about 0.54 inches, or about 0.48 inches to about 0.52 inches. In some embodiments, the distance between point X1 and point X2 is or about 0.50 inches. In some embodiments, a distance H2 from the end of outlet 106 to second inlet axis A2 is less than H1. In some embodiments, distance H2 is about 0.80 to about 1.05 inches, about 0.85 to about 1.00 inches, or about 0.90 inches to about 0.95 inches. In some embodiments, distance H2 is or about 0.933 inches±0.005 inches.

In some embodiments, gas channel 124 may have a diameter D4 that is substantially the same as diameter D1. In other embodiments, diameter D4 may be less than or greater than diameter D1. In some embodiments, for example, D4 is from about 0.20 inches to about 0.30 inches, about 0.22 inches to about 0.28 inches, or about 0.24 inches to about 0.26 inches. In some embodiments diameter D4 is or about 0.250 inches±0.005 inches. Diameter D4, in some embodiments, may be the broadest diameter of gas channel 124. In some embodiments, a ratio of diameter D4 to diameter D1 is about 0.90 to about 1.10, about 0.95 to about 1.05, or about 1.00.

Figure 6A:
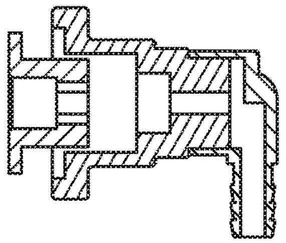
FIG. 6A shows a side cross-sectional view of the jet nozzle of FIG. 5A.
Figure 6B:
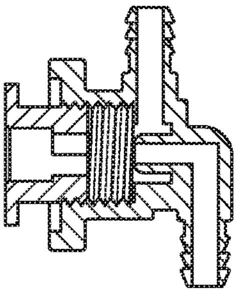
FIGS. 6B-6F show side cross-sectional views of the jet nozzles of FIGS. 5B-5F, respectively.
Figure 6C:
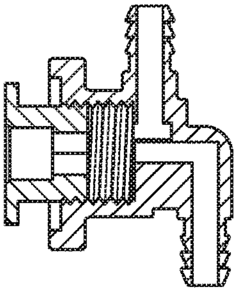
Figure 6D:
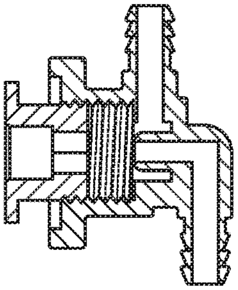
Figure 6E:
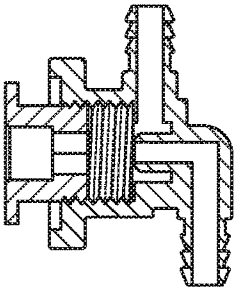
Figure 6F:
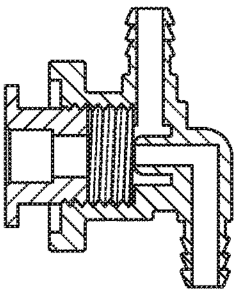
Figure 7A:
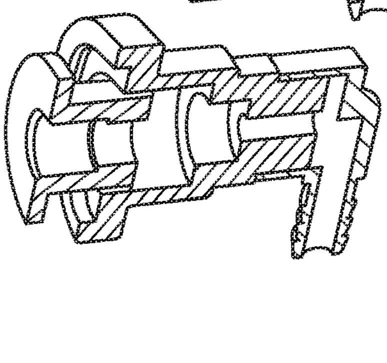
FIG. 7A shows a perspective cross-sectional view of the jet nozzle of FIG. 5A.
Figure 7B:
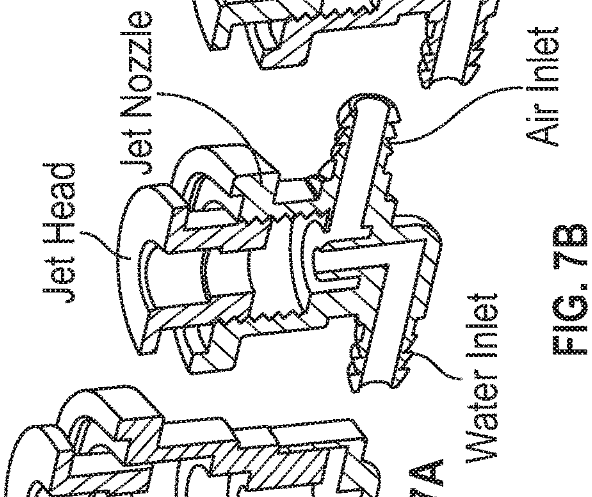
FIGS. 7B-7F show perspective cross-sectional views of the jet nozzles of FIGS. 5B-5F, respectively.
Figure 7C:
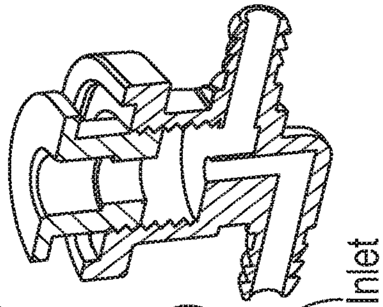
Figure 7D:
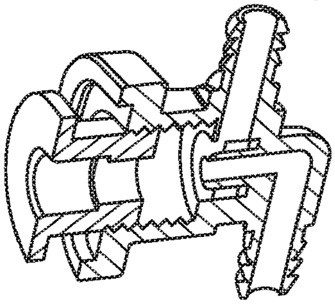
Figure 7E:
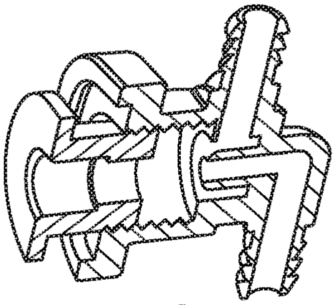
Figure 7F:
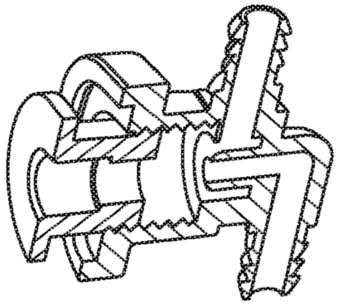

In some embodiments, gas channel 124 connects to and is in flow communication with chamber 120 of jet nozzle 100 such that gas (e.g., air) received through air inlet 108 moves from gas channel 124 to chamber 120 during use. In some embodiments, as discussed, jet nozzle 100 includes an air chamber 126 in the fluid path between gas channel 124 and chamber 120. In some embodiments, air chamber 126 may surround channel wall 114 or at least a portion of channel wall 114. In some embodiments, air chamber 126 is an annular chamber that is coaxial with channel wall 114 and outlet axis A2. In other embodiments, air chamber 126 need not be coaxial with and/or does not surround channel wall 114 (e.g., configuration shown in FIGS. 6C and 7C).

In use, according to certain embodiments of the present invention, water flows from a pressurized fluid source (e.g., water pump, plumbing line, etc.) through water inlet 104 and channel wall 114 of jet nozzle 100. In some embodiments, a Venturi effect is created as the water stream passes through the smaller-diameter channel wall 114. Without wishing to be bound by theory, the Venturi effect causes air to be drawn through air inlet 108 and air chamber 126 and into chamber 120, where it is allowed to mix, at least partially, with the water exiting end 118 of channel wall 114 to create an aerated water stream. The aerated water stream may then exit through outlet 106 of jet nozzle 100 as described. In some embodiments, a separate jet head is inserted through outlet 106 and through which the aerated water stream flows as it exits jet nozzle 100.

Figure 8A:
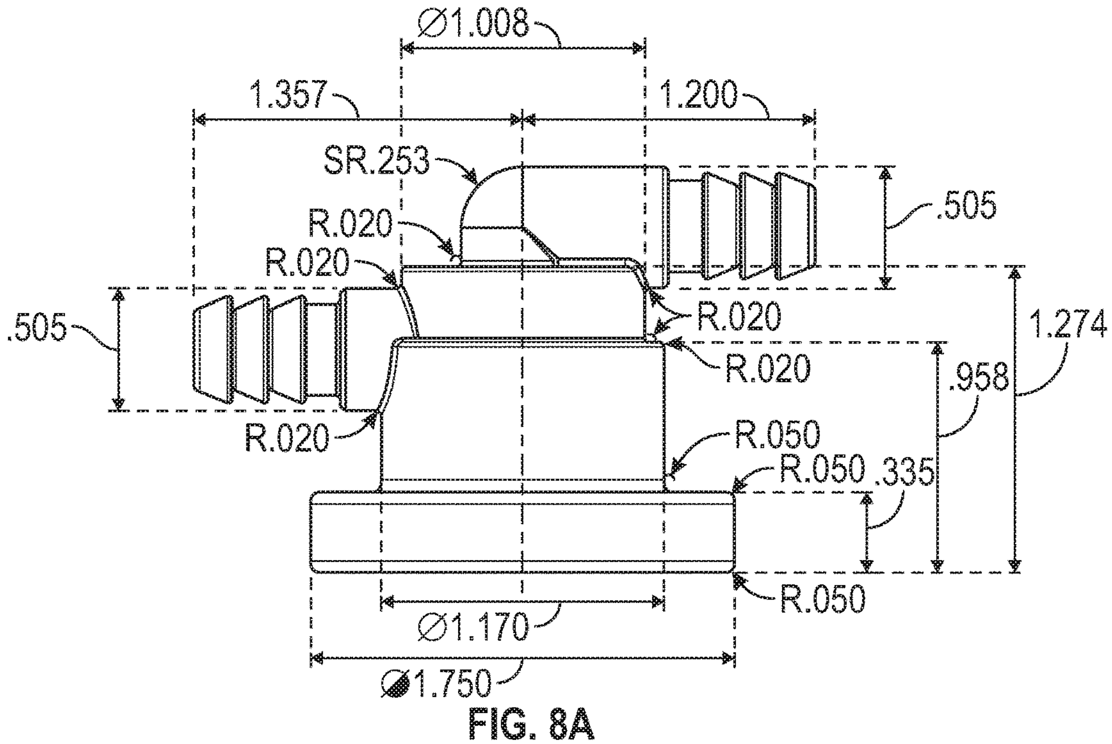
FIGS. 8A-8E provide example measurements (in inches) of a jet nozzle according to an embodiment of the present invention.
Figure 8B:
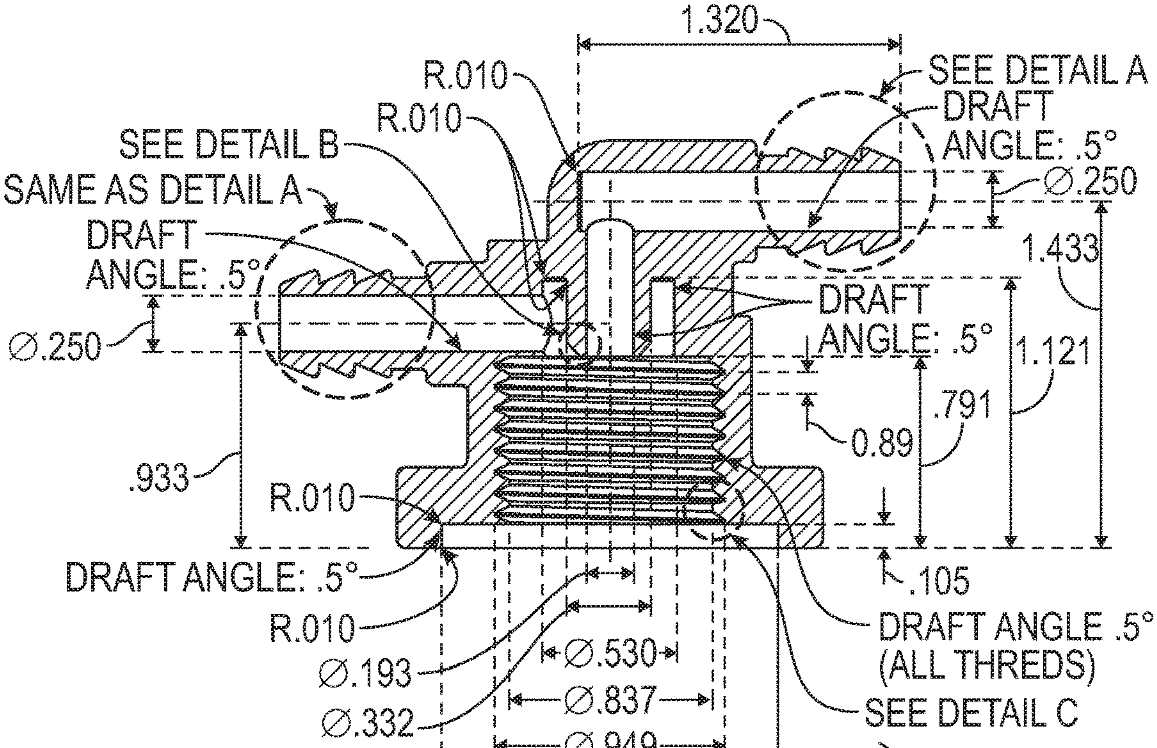
Figure 8C:
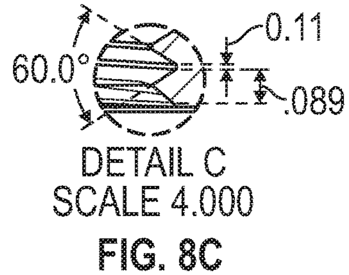
Figure 8D:
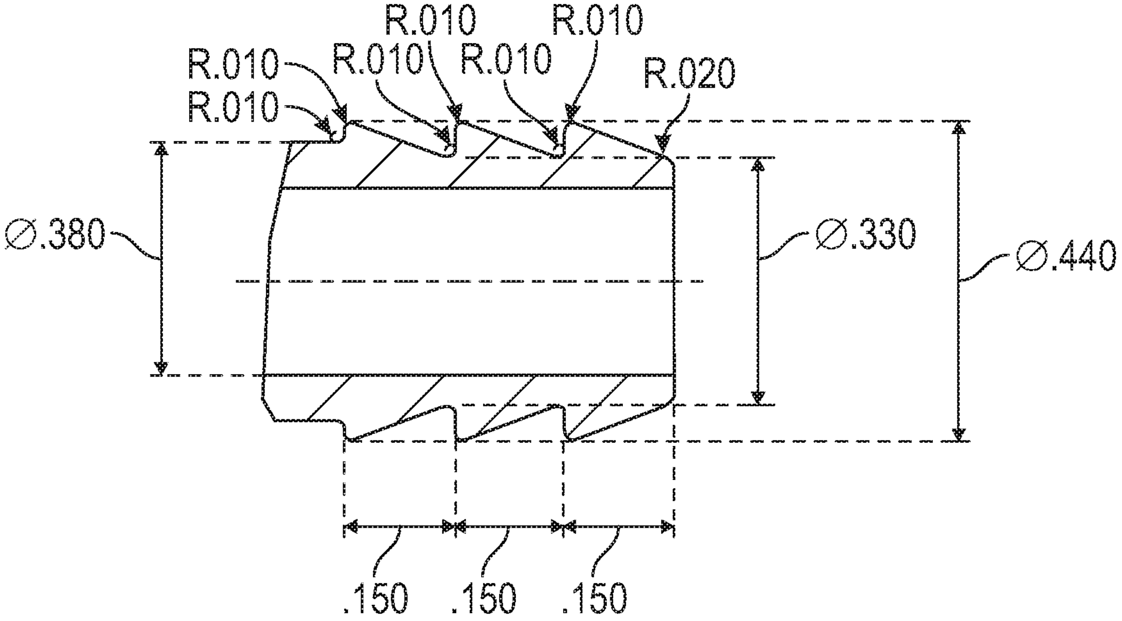
Figure 8E:
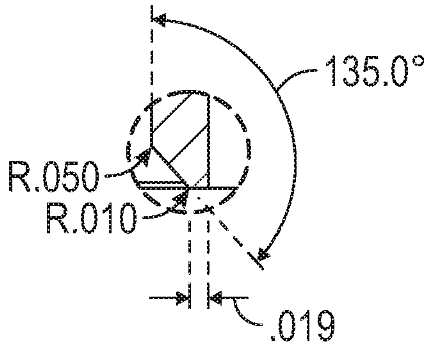

Further example measurements of a jet nozzle according to an embodiment of the present invention are provided in FIGS. 8A-8D. The measurement values are in units of inches unless otherwise specified and should be considered as including tolerances of ±0.005 inches. FIG. 8A provides example measurements for a jet nozzle similar to the embodiment shown in FIG. 2. FIG. 8B is a cross-sectional view of the example jet nozzle shown in FIG. 8A. FIG. 8C provides an enlarged detail of the area indicated by the circle shown in FIG. 8B which refers to DETAIL C. FIG. 8D provides an enlarged detail of the area indicated by the circle shown in FIG. 8B which refers to DETAIL A. FIG. 8E provides an enlarged detail of the area indicated by the circle shown in FIG. 8B which refers to DETAIL B.

FIGS. 5A-7F compare the geometries of a jet nozzle according to the state of the art (FIGS. 5A, 6A, and 7A) with various jet nozzles in accordance with embodiments of the present invention (FIGS. 5B-5F, 6B-6F, and 7B-7F). As can be seen from these figures, jet nozzles according to embodiments of the present invention can have a smaller overall dimension (e.g., height) when compared to the jet nozzle of the state of the art, which allows them to fit into smaller spaces and permit easier installation. The below table provides computational fluid dynamics (CFD) data of the jet nozzles shown in FIGS. 5A-5F.

| Jet Nozzle | Force at Outlet (N) | Water Area % at Outlet |
|---|---|---|
| 5A | 0.539 | 10.9 |
| 5B | 0.464 | 12.5 |
| 5C | 0.467 | 12.3 |
| 5D | 0.475 | 12.4 |
| 5E | 0.476 | 12.7 |
| 5F | 0.475 | 12.1 |

Exiting the outlet are pure water, pure air and water/air mixture. The Force at Outlet is a measure of the force of pure water at the outlet in Newtons (N). The Force at Outlet results are comparable. The Water Area % at Outlet represents the amount of pure water area relative to the total outlet area. Jet nozzles 5B-5F of the present invention exhibit improved Water Area % at Outlet compared to 5A. This will provide for a more soothing and less "needle-like" force on skin.

In some embodiments, a distance from an end of the outlet to the first inlet axis is from any of about 1.30 inches, about 1.31 inches, about 1.32 inches, about 1.33 inches, about 1.34 inches, about 1.35 inches, about 1.36 inches, about 1.37 inches, about 1.38 inches, or about 1.39 inches, to any of about 1.40 inches, about 1.41 inches, about 1.42 inches, about 1.43 inches, about 1.44 inches, about 1.45 inches, about 1.46 inches, about 1.47 inches, about 1.48 inches, about 1.49 inches, about 1.50 inches, about 1.51 inches, about 1.52 inches, about 1.53 inches, about 1.54 inches, about 1.55 inches, or more. In some embodiments, distance from the end of the outlet to the first inlet axis is or about 1.433 inches±0.005 inches.

In some embodiments, a distance from the end of the outlet to the second inlet axis is from any of about 0.80 inches, about 0.81 inches, about 0.82 inches, about 0.83 inches, about 0.84 inches, about 0.85 inches, about 0.86 inches, about 0.87 inches, about 0.88 inches, about 0.89 inches, or about 0.90 inches, to any of about 0.91 inches, about 0.92 inches, about 0.93 inches, about 0.94 inches, about 0.95 inches, about 0.96 inches, about 0.97 inches, about 0.98 inches, about 0.99 inches, about 1.00 inches, about 1.01 inches, about 1.02 inches, about 1.03 inches, about 1.04 inches or about 1.05 inches, or more. In some embodiments, distance from the end of the outlet to the second inlet axis is or about 0.933 inches±0.005 inches.

In some embodiments the first inlet axis and second inlet axis are substantially parallel and will have a "substantially perpendicular" distance therebetween. In some embodiments, this substantially perpendicular distance is from any of about 0.40 inches, about 0.41 inches, about 0.42 inches, about 0.43 inches, about 0.44 inches, about 0.45 inches, about 0.46 inches, about 0.47 inches, about 0.48 inches, about 0.49 inches, about 0.50 inches, about 0.51 inches, or about 0.52 inches, to any of about 0.53 inches, about 0.54 inches, about 0.55 inches, about 0.56 inches, about 0.57 inches, or about 0.58 inches, about 0.59 inches, about 0.60 inches, or more.

In some embodiments, one or more jet nozzles according to the present invention may be provided in a kit to be retrofitted onto existing bathtubs, hot tubs, spas, basins, pools, etc. In some embodiments, the kits may also include various tools for installing the one or more jet nozzles and/or tubing for connecting the one or more jet nozzles to the fluid and/or gas sources. In some embodiments, jet nozzles according to embodiments of the present invention may be pre-installed onto the bathtubs, hot tubs, spas, basins, pools, etc.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps that perform substantially the same function or achieve substantially the same result as the corresponding embodiments described herein may be utilized according to the present invention.

The term "flow communication" or "fluid communication" means for example configured for liquid or gas flow there through. The terms "upstream" and "downstream" indicate a direction of gas or fluid flow, that is, gas or fluid will flow from upstream to downstream.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, 2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

All U.S. patent applications, published patent applications and patents referred to herein are hereby incorporated by reference.

The invention claimed is:

1. A jet nozzle comprising a single-piece body including a water inlet having a first inlet channel coaxial with a first inlet axis, a gas inlet having a second inlet channel coaxial with a second inlet axis, and an outlet coaxial with an outlet axis, the single-piece body defining a fluid passageway from the first inlet channel to the outlet;

an annular channel wall surrounding a water channel positioned in the fluid passageway between the first inlet channel and the outlet, the water channel being coaxial with the outlet axis and having a diameter that is smaller than a diameter of the first inlet channel;

an annular air chamber surrounding the annular channel wall, the air chamber in flow communication with and disposed between the second inlet channel and the mixing chamber, and a mixing chamber coaxial with the outlet axis and positioned in the fluid passageway between the water channel and the outlet, the mixing chamber in flow communication with the gas inlet and having a diameter greater than a combined total diameter of the water channel, the annular channel wall, and the annular air chamber, wherein the second inlet axis is substantially perpendicular to and intersects the outlet axis at a point within the water channel, the first inlet channel, the water channel, and the mixing chamber each have a constant diameter, the outlet has a diameter that is larger than the diameter of the mixing chamber, the annular channel wall extends from a channel wall first end positioned at an air chamber first end to a channel wall second end positioned at an air chamber second end or positioned in the mixing chamber, the annular channel wall first end and second end each extend beyond the second inlet channel such that the annular channel wall completely overlaps the second inlet channel, and the jet nozzle is configured so that air exiting the second inlet channel impinges the annular channel wall to create a turbulent flow and mixing with water in the mixing chamber.

2. The jet nozzle of claim 1, wherein the first inlet axis intersects the outlet axis at a point located within the first inlet channel.

3. The jet nozzle of claim 1, wherein the mixing chamber includes a wall having an internal screw thread.

4. The jet nozzle of claim 3, wherein the water inlet and the gas inlet are fixed relative to each other.

5. The jet nozzle of claim 1, wherein the water inlet and the gas inlet extend away from the outlet axis in substantially opposite directions.

6. The jet nozzle of claim 1, wherein the distance from the end of the outlet to the first inlet axis is from about 1.35 inches to about 1.50 inches.

7. The jet nozzle of claim 1, wherein the distance from the end of the outlet to the first inlet axis is from about 1.30 inches to about 1.55 inches.

8. The jet nozzle of claim 1, wherein a distance from an end of the outlet to the second inlet axis is less than a distance from the end of the outlet to the first inlet axis.

9. The jet nozzle of claim 1, wherein the distance from the end of the outlet to the second inlet axis is from about 0.85 inches to about 1.00 inches.

10. The jet nozzle of claim 1, the distance from the end of the outlet to the second inlet axis is from about 0.80 inches to about 1.05 inches.

11. The jet nozzle of claim 1, wherein a substantially perpendicular distance between the first inlet axis and the second inlet axis is from about 0.40 inches to about 0.60 inches.

12. The jet nozzle of claim 11, wherein the substantially perpendicular distance between the first inlet axis and the second inlet axis is about 0.50 inches.

13. The jet nozzle of claim 1, wherein a diameter of the second inlet channel is substantially the same as the diameter of the first inlet channel.

14. The jet nozzle of claim 1, wherein the single-piece body is molded as a single component.

15. A tub comprising one or more jet nozzles according to claim 1.

16. The tub of claim 15, selected from the group consisting of a bath tub, a hot tub, and a spa tub.

17. The jet nozzle of claim 1, wherein the annular channel wall second end is positioned at the air chamber second end.

18. The jet nozzle of claim 1, wherein the annular channel wall second end is positioned in the mixing chamber, such that the mixing chamber surrounds a portion of the channel wall.

19. The jet nozzle of claim 1, wherein the annular channel wall second end comprises a beveled or chamfered edge configured to direct air flow around the channel wall second end.

20. The jet nozzle of claim 1, wherein the first inlet axis is substantially parallel to the second inlet axis.

* * * * *